United States Patent
Saito et al.

(10) Patent No.: US 10,164,445 B2
(45) Date of Patent: Dec. 25, 2018

(54) ELECTRIC POWER SYSTEM AND CONTROL METHOD THEREFOR

(71) Applicant: TOYOTA JIDOSHA KABUSHIKI KAISHA, Toyota-shi, Aichi-ken (JP)

(72) Inventors: Hiromu Saito, Toyota (JP); Ryo Shibuya, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 76 days.

(21) Appl. No.: 15/606,763

(22) Filed: May 26, 2017

(65) Prior Publication Data

US 2017/0358935 A1 Dec. 14, 2017

(30) Foreign Application Priority Data

Jun. 9, 2016 (JP) ................. 2016-115620

(51) Int. Cl.
*H02J 3/32* (2006.01)
*H02J 3/34* (2006.01)
(Continued)

(52) U.S. Cl.
CPC .......... *H02J 7/0024* (2013.01); *B60L 3/0084* (2013.01); *B60L 11/1887* (2013.01); *H02J 7/0009* (2013.01); *H02J 7/0026* (2013.01); *H02J 7/0029* (2013.01); *H02J 7/0031* (2013.01); *H02J 7/0068* (2013.01); *H02J 2007/004* (2013.01); *H02J 2007/0037* (2013.01); *H02J 2007/0095* (2013.01)

(58) Field of Classification Search
CPC ... B60L 11/1887; B60L 3/0084; H02J 7/0009; H02J 7/0024; H02J 7/0026; H02J 7/0029; H02J 7/0031; H02J 7/0068; H02J 2007/0037; H02J 2007/004; H02J 2007/0095

USPC ........................................ 307/46
See application file for complete search history.

(56) References Cited

U.S. PATENT DOCUMENTS

2012/0049771 A1* 3/2012 Komatsu ............... B60W 10/28
318/139
2014/0079960 A1 3/2014 Yun
(Continued)

FOREIGN PATENT DOCUMENTS

JP 2012-120347 A 6/2012
JP 2014-060912 A 4/2014
(Continued)

*Primary Examiner* — Daniel Kessie
*Assistant Examiner* — Toan Vu
(74) *Attorney, Agent, or Firm* — Dickinson Wright, PLLC

(57) ABSTRACT

An electric power system includes a relay which is switched between an on state in which charging/discharging of a battery is permitted and an off state in which charging/discharging of the battery is inhibited, and an electronic control unit which controls switching of the relay between an on state and an off state based on a command from an electronic control unit. When a command for switching the relay from the on state to the off state is given from the electronic control unit to the electronic control unit, in a case where an abnormality occurs in the electronic control unit or in a case where an abnormality occurs in communication between the electronic control unit and the electronic control unit, the electronic control unit switches the relay to the off state.

4 Claims, 3 Drawing Sheets

(51) Int. Cl.
    *H02J 7/00*     (2006.01)
    *B60L 3/00*     (2006.01)
    *B60L 11/18*     (2006.01)

(56) References Cited

U.S. PATENT DOCUMENTS

| | | | | |
|---|---|---|---|---|
| 2014/0265600 A1* | 9/2014 | Tsukamoto | ............... | H02J 1/00 307/77 |
| 2014/0354054 A1* | 12/2014 | Katou | ................... | H02J 7/0029 307/43 |
| 2017/0117595 A1 | 4/2017 | Hase et al. | | |

FOREIGN PATENT DOCUMENTS

| | | |
|---|---|---|
| JP | 2014-089533 A | 5/2014 |
| JP | 2014-165979 A | 9/2014 |
| JP | 2015-050896 A | 3/2015 |
| JP | 2015-146707 A | 8/2015 |
| WO | 2015/156210 A1 | 10/2015 |

\* cited by examiner

ELECTRIC POWER SYSTEM AND CONTROL METHOD THEREFOR

INCORPORATION BY REFERENCE

The disclosure of Japanese Patent Application No. 2016-115620 filed on Jun. 9, 2016 including the specification, drawings and abstract is incorporated herein by reference in its entirety.

BACKGROUND

1. Technical Field

The disclosure relates to an electric power system including a plurality of batteries and a control method therefor.

2. Description of Related Art

A fuel cell system is an energy conversion system which supplies fuel gas and oxidant gas to a membrane-electrode assembly and causes an electrochemical reaction to convert chemical energy to electric energy. Above all, a solid polymer electrolyte fuel cell using a solid polymer membrane as an electrolyte is expected for use as an in-vehicle power supply system since compactness is easily achieved at low cost and high output density is achieved. As this kind of in-vehicle power supply system, for example, Japanese Patent Application Publication No. 2015-50896 (JP 2015-50896 A) suggests an electric power system for a heavy vehicle having a configuration in which electric power is supplied from two fuel cell systems to two motor generators to perform powering traveling.

SUMMARY

While an electric power system of the related art has a configuration in which one battery is mounted per fuel cell system and electric power generated by the fuel cell system is stored, in a case of being used as an in-vehicle power supply of a heavy vehicle, in order to meet requirement for high output, a configuration in which a plurality of batteries are mounted per fuel cell system with addition of batteries and charging/discharging of a plurality of batteries is managed using a plurality of electronic control units is considered. In such a configuration, it is preferable to take fail-safe countermeasures such that charging/discharging of an added battery can be safely shut off in consideration of a case where an abnormality occurs in an electronic control unit which manages charging/discharging of the added battery, or the like.

Accordingly, an object is to suggest an electric power system and a control method therefor taking safety into consideration.

An electric power system according to a first aspect includes a first battery configured to be charged with electric power or to discharge the electric power, a first relay configured to be switched between an on state in which charging/discharging of the first battery is permitted and an off state in which charging/discharging of the first battery is inhibited, a first electronic control unit configured to control switching of the first relay between the on state and the off state, a second battery configured to be charged with electric power or to discharge the electric power, a second relay configured to be switched between an on state in which charging/discharging of the second battery is permitted and an off state in which charging/discharging of the second battery is inhibited, and a second electronic control unit configured to control switching of the second relay between the on state and the off state based on a command from the first electronic control unit. When a command for switching the second relay from the on state to the off state is given from the first electronic control unit to the second electronic control unit, in a case where an abnormality occurs in the second electronic control unit or in a case where an abnormality occurs in communication between the first electronic control unit and the second electronic control unit, the first electronic control unit switches the second relay to the off state.

A control method for an electric power system according to a second aspect, includes preparing a first battery configured to be charged with electric power or to discharge the electric power, a first relay configured to be switched between an on state in which charging/discharging of the first battery is permitted and an off state in which charging/discharging of the first battery is inhibited, a first electronic control unit configured to control switching of the first relay between the on state and the off state, a second battery configured to be charged with electric power or to discharge the electric power, a second relay configured to be switched between an on state in which charging/discharging of the second battery is permitted and an off state in which charging/discharging of the second battery is inhibited, and a second electronic control unit configured to control switching of the second relay between the on state and the off state based on a command from the first electronic control unit, and switching the second relay to the off state by the first electronic control unit when a command for switching the second relay from the on state to the off state is given from the first electronic control unit to the second electronic control unit, in a case where an abnormality occurs in the second electronic control unit or in a case where an abnormality occurs in communication between the first electronic control unit and the second electronic control unit.

According to the first and second aspects, when the command for switching the second relay from the on state to the off state is given from the first electronic control unit to the second electronic control unit, in a case where an abnormality occurs in the second electronic control unit or in a case where an abnormality occurs in communication between the first electronic control unit and the second electronic control unit, the first electronic control unit switches the second relay to the off state, whereby it is possible to increase safety of the electric power system.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
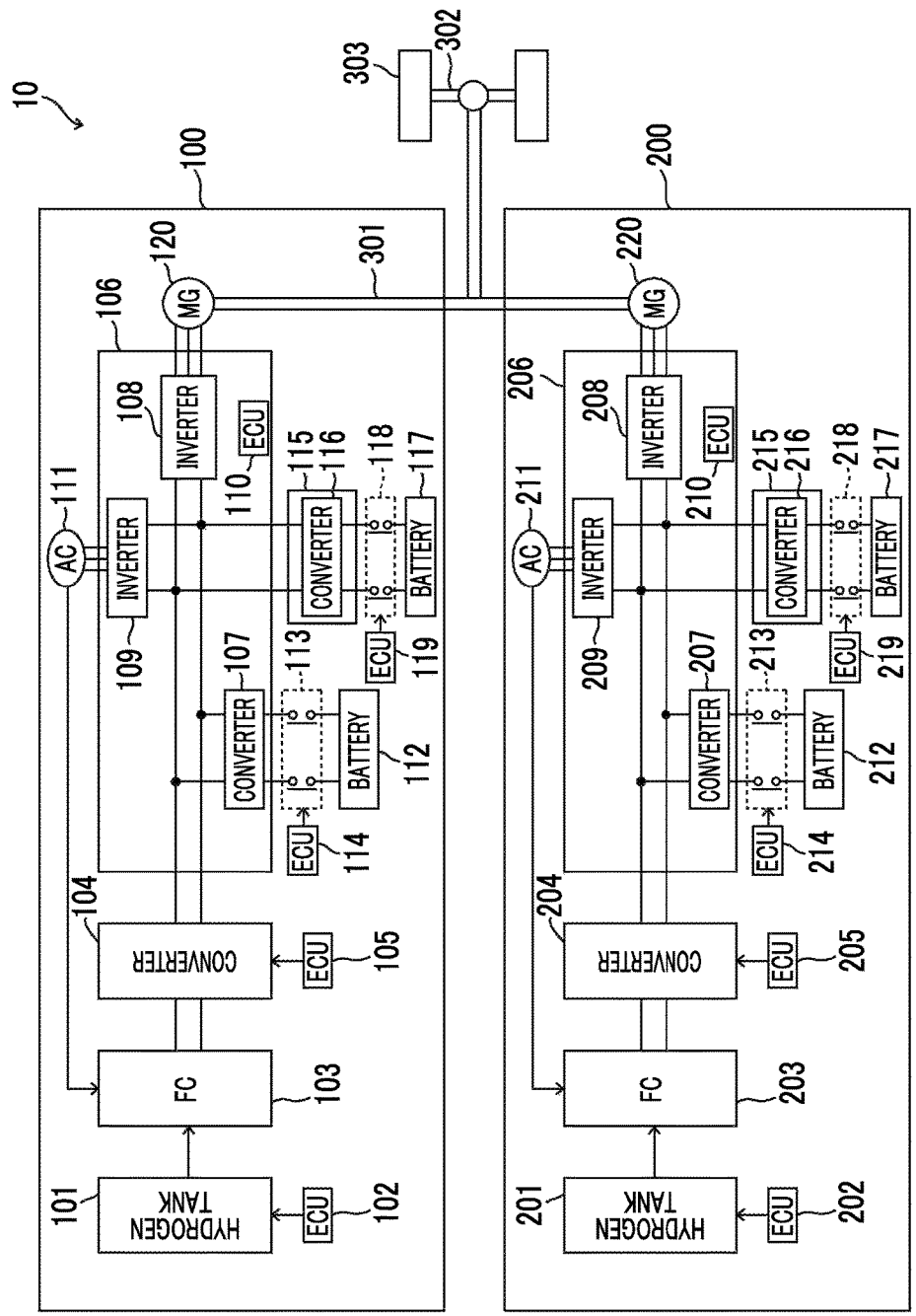
FIG. 1 is a block diagram showing the configuration of a power supply system according to this embodiment.

Hereinafter, an embodiment will be described referring to FIGS. 1 to 3. The same reference numerals represent the same elements, and overlapping description will not be repeated. FIG. 1 is a block diagram showing the configuration of a power supply system 10 according to this embodiment. The power supply system 10 is an in-vehicle power supply system which is designed for a heavy vehicle, such as a bus, and includes two electric power systems 100, 200. Since the electric power systems 100, 200 have the same configuration, for convenience of description, description will be provided focusing on the electric power system 100, and detailed description of the electric power system 200 will be omitted. The electric power system 100 includes a fuel cell 103 which receives hydrogen from a hydrogen tank 101 and receives oxygen from an air compressor 111 to generate electric power. The fuel cell 103 is a solid polymer electrolyte cell stack in which a plurality of cells are laminated in series. In the fuel cell 103, an oxidation reaction of Formula (1) occurs on an anode electrode, and a reduction reaction of Formula (2) occurs on a cathode electrode. An electromotive reaction of Formula (3) occurs as the whole of the fuel cell 103.

  (1)

  (2)

  (3)

The electric power system 100 includes a DC/DC converter 104 which boosts an output voltage of the fuel cell 103, batteries 112, 117 which charge electric power generated by the fuel cell 103 or electric power regenerated by a motor generator 120 described below, and an electric power control unit 106 which converts DC electric power supplied from the fuel cell 103 or the batteries 112, 117 to AC electric power to drive the motor generator 120 and the air compressor 111. The electric power control unit 106 includes an inverter 108 which converts DC electric power to AC electric power to drive the motor generator 120, an inverter 109 which converts DC electric power to AC electric power to drive the air compressor 111, and a DC/DC converter 107 which boosts a DC voltage from the battery 112 to supply the DC voltage to the inverters 108, 109 and deboosts electric power generated by the fuel cell 103 or electric power regenerated by the motor generator 120 to supply electric power to the battery 112. The electric power system 100 further includes an electric power control unit 115 having a DC/DC converter 116 which boosts a DC voltage from the battery 117 to supply the DC voltage to the inverters 108, 109 and deboosts electric power generated by the fuel cell 103 or electric power regenerated by the motor generator 120 to supply electric power to the battery 117. The DC/DC converters 107, 116 and the inverters 108, 109 are respectively connected in parallel with the DC/DC converter 104. The motor generator 120 functions as an electric motor which consumes electric power from the fuel cell 103 or the batteries 112, 117 to obtain drive power for powering traveling, and functions as a power generator which charges the batteries 112, 117 with electric power recovered by regenerative braking. An output shaft of the motor generator 120 is connected by a gear 301 and drives drive wheels 303 through an axle 302.

The electric power system 100 includes an electronic control unit 102 which controls supply of hydrogen from the hydrogen tank 101 to the fuel cell 103, an electronic control unit 105 which controls drive of the DC/DC converter 104, an electronic control unit 110 which controls drive of the inverters 108, 109 and the DC/DC converter 107, and an electronic control unit 114 which controls the electric power system 100 entirely. These electronic control units 102, 105, 110, 114 are connected to one another through, for example, a communication line, such as a serial bus. The electronic control unit 114 gives control commands to the above-described electronic control units 102, 105, and 110 based on signals, such as an accelerator signal, a brake signal, a shift signal, and a vehicle speed signal, such that a desired operation state (acceleration, deceleration, stop, or the like) is obtained. The electronic control unit 114 is configured to further perform opening/closing control of a relay 113 connected to the battery 112. The relay 113 is switched between an on state in which charging/discharging of the battery 112 is permitted and an off state in which charging/discharging of the battery 112 is inhibited. The electronic control unit 114 controls switching of the relay 113 between the on state and the off state when the electric power system 100 is activated, power generation is stopped, or the like. The electric power system 100 further includes an electronic control unit 119 which performs opening/closing control of a relay 118 connected to the battery 117. The relay 118 is switched between an on state in which charging/discharging of the battery 117 is permitted and an off state in which charging/discharging of the battery 117 is inhibited. The electronic control unit 119 is not configured to autonomously open/close the relay 118 from the viewpoint of safety, and controls switching of the relay 118 between the on state and the off state based on a command from the electronic control unit 114. The relays 113, 118 are also referred to as a "system main relay".

The electronic control units 102, 105, 110, 114, 119 are a computer system including a CPU, a memory, and an input/output interface. In particular, the electronic control unit 114 is referred to as a "PM-ECU", and the electronic control unit 119 is referred to as a "GW-ECU". The batteries 112, 117 function as a storage source of surplus electric power, a regenerative energy storage source at the time of regenerative braking, and an energy buffer at the time of load fluctuation with acceleration or deceleration of a vehicle. As the batteries 112, 117, for example, a secondary battery, such as a nickel-cadmium storage battery, a nickel-hydrogen storage battery, or a lithium secondary battery, is suitably used.

Figure 2:
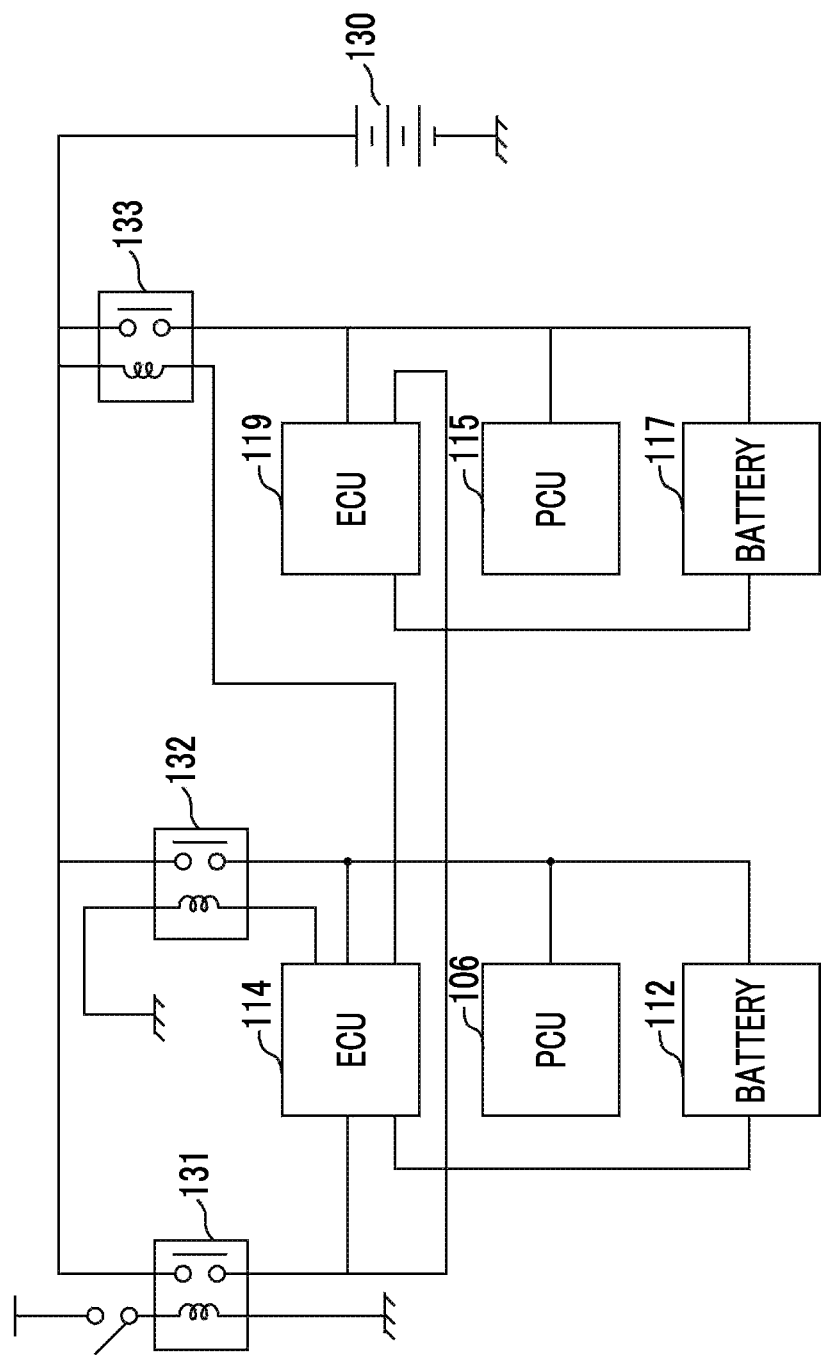
FIG. 2 is an explanatory view of a power supply circuit of an electronic control unit according to this embodiment.

FIG. 2 is an explanatory view of a power supply circuit of the electronic control units 114, 119. The electronic control units 114, 119 are respectively connected to a power supply 130 through power supply relays 132, 133. The power supply relay 132 is switched between an on state, in which power supply from the power supply 130 to the electronic control unit 114 is permitted, and an off state, in which power supply from the power supply 130 to the electronic control unit 114 is inhibited, in response to a command from the electronic control unit 114. The power supply relay 133 is switched between an on state, in which power supply from the power supply 130 to the electronic control unit 119 is permitted, and an off state, in which power supply from the power supply 130 to the electronic control unit 119 is inhibited, in response to a command from the electronic control unit 114.

Figure 3:
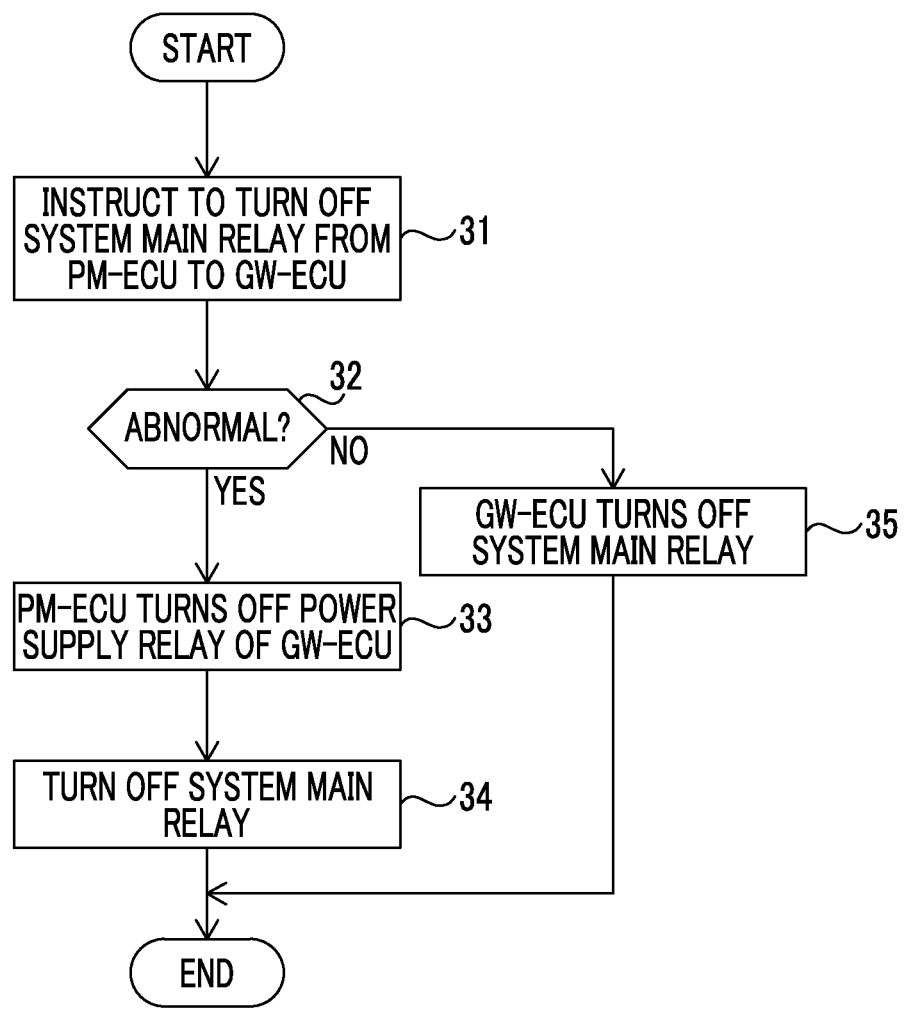
FIG. 3 is a flowchart showing a control method of a relay according to this embodiment.

FIG. 3 is a flowchart showing a control method of the relay 118. A command for switching the relay 118 from the on state to the off state is given from the electronic control unit 114 to the electronic control unit 119 (Step 31). In a case where the electronic control unit 119 is normal and communication between the electronic control unit 114 and the electronic control unit 119 is normal (Step 32; NO), the electronic control unit 119 switches the relay 118 from the on state to the off state based on the command from the electronic control unit 114 (Step 35). In a case where an abnormality occurs in the electronic control unit 119 or in a case where an abnormality occurs in communication between the electronic control unit 114 and the electronic control unit 119 (Step 32; YES), the electronic control unit 114 switches the power supply relay 133 from the on state to the off state (Step 33), thereby forcibly stopping power supply to the electronic control unit 119. With this, since a control signal for commanding to bring the relay 118 into the on state is not supplied from the electronic control unit 119 to the relay 118, the relay 118 is forcibly switched from the on state to the off state (Step 34). In this way, in a case where an abnormality occurs in the electronic control unit 119 or in a case where an abnormality occurs in communication between the electronic control unit 114 and the electronic control unit 119, the electronic control unit 114 forcibly switches the relay 118 to the off state without passing through the electronic control unit 119, whereby it is possible to increase safety of the electric power system 100.

The embodiment described above is intended for easy understanding of the disclosure and is not in any way to be construed as limiting the disclosure. The embodiment may be modified and improved without limiting the disclosure, and equivalents thereof are also encompassed by the disclosure. That is, design modifications to the embodiment, which will be made by those skilled in the art as appropriate, are also included in the scope of the invention as long as the modifications have the features of the disclosure.

What is claimed is:

1. An electric power system comprising:
   a first battery configured to be charged with electric power or to discharge the electric power;
   a first relay configured to be switched between an on state in which charging/discharging of the first battery is permitted and an off state in which charging/discharging of the first battery is inhibited;
   a first electronic control unit configured to control switching of the first relay between the on state and the off state;
   a second battery configured to be charged with electric power or to discharge the electric power;
   a second relay configured to be switched between an on state in which charging/discharging of the second battery is permitted and an off state in which charging/discharging of the second battery is inhibited; and
   a second electronic control unit configured to control switching of the second relay between the on state and the off state based on a command from the first electronic control unit,
   wherein, when a command for switching the second relay from the on state to the off state is given from the first electronic control unit to the second electronic control unit,
   (i) in a case where an abnormality occurs in the second electronic control unit, or
   (ii) in a case where an abnormality occurs in communication between the first electronic control unit and the second electronic control unit,
   the first electronic control unit switches the second relay to the off state.

2. The electric power system according to claim 1, wherein the first electronic control unit stops power supply to the second electronic control unit, such that supply of a control signal for commanding to bring the second relay into the on state to the second relay is stopped to switch the second relay to the off state.

3. A control method for an electric power system comprising:
   preparing a first battery configured to be charged with electric power or to discharge the electric power, a first relay configured to be switched between an on state in which charging/discharging of the first battery is permitted and an off state in which charging/discharging of the first battery is inhibited, a first electronic control unit configured to control switching of the first relay between the on state and the off state, a second battery configured to be charged with electric power or to discharge the electric power, a second relay configured to be switched between an on state in which charging/discharging of the second battery is permitted and an off state in which charging/discharging of the second battery is inhibited, and a second electronic control unit configured to control switching of the second relay between the on state and the off state based on a command from the first electronic control unit; and
   switching the second relay to the off state by the first electronic control unit, when a command for switching the second relay from the on state to the off state is given from the first electronic control unit to the second electronic control unit, in a case where an abnormality occurs in the second electronic control unit or in a case where an abnormality occurs in communication between the first electronic control unit and the second electronic control unit.

4. The control method for an electric power system according to claim 3,
   wherein the first electronic control unit stops power supply to the second electronic control unit, such that supply of a control signal for commanding to bring the second relay into the on state to the second relay is stopped to switch the second relay to the off state.

* * * * *